June 16, 1925.  E. C. DODGE  1,541,799

COMPARTMENT STEAM COOKER

Filed Feb. 8, 1924

Inventor
Ethel C. Dodge
By Barlow & Barlow
Attorneys

Patented June 16, 1925.

UNITED STATES PATENT OFFICE.

ETHEL C. DODGE, OF EAST GREENWICH, RHODE ISLAND.

COMPARTMENT STEAM COOKER.

Application filed February 8, 1924. Serial No. 691,402.

*To all whom it may concern:*

Be it known that I, ETHEL C. DODGE, a citizen of the United States, residing at East Greenwich, in the county of Kent and State of Rhode Island, have invented certain new and useful Improvements in Compartment Steam Cookers, of which the following is a specification.

This invention relates to an improvement in a compartment steam-cooking utensil; and has for its object to provide a steam-cooking utensil having a body portion in which water may be boiled and having a plate or frame covering, or support on this receptacle, which is provided with a plurality of cups or compartments arranged to extend downwardly into the receptacle and adapted to receive the food to be cooked, the bottoms of said cups cooperating to provide a broad supporting base when the plate with its cups is removed from the receptacle and used as a dish from which the foods may be eaten.

A further object of this invention is the provision of a lid having downwardly-extending protuberances positioned to form individual covers for the cups whereby the odors of the different foods in the different cups are prevented from intermingling one with the other.

With these and other objects in view, the invention consists of certain novel features of construction, as will be more fully described, and particularly pointed out in the appended claim.

Figure 1:
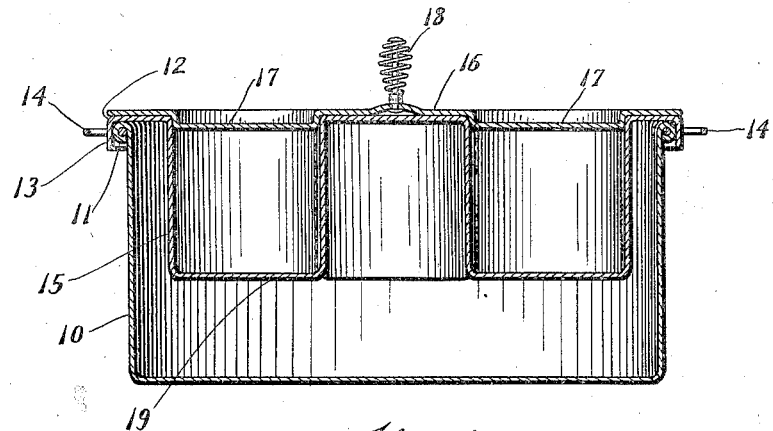
Figure 1 is a sectional elevation of a complete assembled device which would be approximately on line 1—1 of Figure 2.
Figure 2:
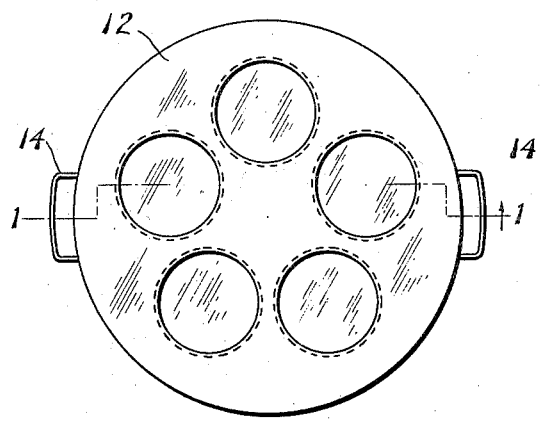
Figure 2 is a plan view of the cup-supporting plate or frame.
Figure 4:
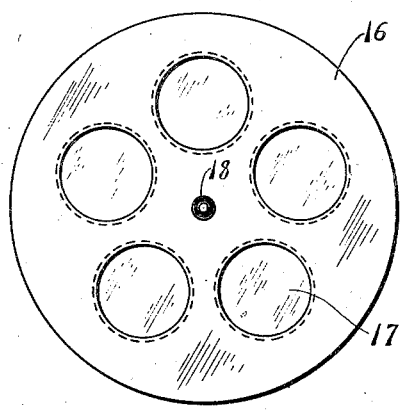
Figure 4 is a plan view of the lid.
Figure 3:
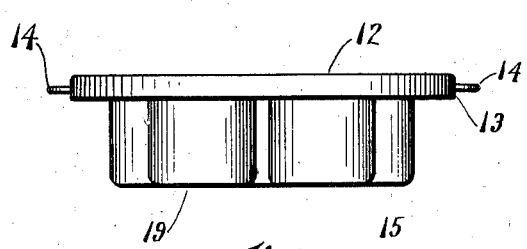
Figure 3 is a side elevation of the cup assembly.
Figure 5:
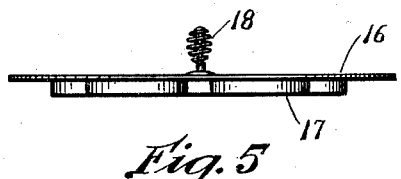
Figure 5 is a side elevation of the lid.

It is found in the practical use of cooking utensils of this character of advantage to provide a cup-supporting plate adapted to be carried by a water boiling receptacle which has a plurality of dependent cups or compartments fixed to the supporting plate or frame, which cups or compartments are of substantially equal depth and are distributed about the plate in such a manner that when the plate with its cooked food is removed from the receptacle and placed upon the table these cups provide such a broad supporting base that the whole cannot be readily tipped or upset even by the activities of a small child eating from the same.

It is also found of advantage to provide a lid having means for closing each of the individual cups to prevent the odors of the different foods being cooked in the different cups, from intermingling one with another, which is of importance and of particular advantage when foods of different characters are being cooked or heated in the different compartments of this utensil; and the following is a detailed description of one construction of such a device by which these advantageous results may be accomplished:—

With reference to the drawings, 10 designates the body portion of the main receptacle which is of a substantial depth and adapted to receive a portion of water and to be set upon a stove for the purpose of boiling the same. The upper edge 11 of this receptacle is preferably rolled outwardly over a wire to stiffen the same.

A cup-supporting member 12 preferably in plate form, is provided with a downwardly-turned edge 13 adapted to fit over the rolled edge 11 of the water-boiling receptacle and a pair of manipulating handles 14 may be attached to the edges of this plate. This plate is provided with a plurality of cups or compartments 15 which extend downwardly from its face a substantial distance into the water receptacle, the depths of all of the cups being substantially equal and each cup is preferably formed with a flat bottom portion 19 all being arranged to cooperate to provide a broad supporting base for this group of cups when the same is removed from the water receptacle and placed upon a table to effectually prevent the same from being upset even by the unrestrained, energetic movements of a small child. The several cups providing a convenient means whereby several different kinds of foods may be cooked, re-heated or kept warm at the same time.

It is also found of advantage in a utensil of this character to provide a lid or plate 16 which is adapted to cover the entire utensil if desired, but which is preferably constructed with downwardly-extending protuberances or portions 17 which are adapted to fit snugly into the different cups or compartments to effectually close the same for several reasons; among others being first, to retain the heat in the cups; and second, to keep the moisture of the steam from the foods in each cup and so prevent the foods from drying and keeping the foods in a moist condition and make it more palatable; and third, by effectually closing each of these cups the odors from the different foods are kept from intermingling with each other.

The protuberances 17 are preferably made integral with plate 16, though they may be secured to the plate by any old and well known method.

In order that this lid may be readily removed, I have provided a handle 18 formed of coiled wire which construction reduces the accumulated heat and prevents excess temperatures.

My improved cooking utensil is very simple and practical in construction, is effective in its operation and by its use several different kinds of foods may be prepared and cooked at once and kept hot by the hot water in the receptacle beneath and the same is particularly adapted for use for small children inasmuch as small portions may be served and served in the cooking cups without danger of being upset and spilled.

The foregoing description is directed solely towards the construction illustrated, but I desire it to be understood that I reserve the privilege of resorting to all the mechanical changes to which the device is susceptible, the invention being defined and limited only by the terms of the appended claim.

I claim:

A cooking utensil comprising a body portion, a plate supported by the body portion, a plurality of cups affixed to the plate and extending downwardly into the body portion, and a lid having a plurality of depressions formed integrally thereon and adapted to extend into the tops of the cups and effectively close them.

In testimony whereof I affix my signature.

ETHEL C. DODGE.